United States Patent [19]
Loeffler

[11] Patent Number: 5,560,461
[45] Date of Patent: Oct. 1, 1996

[54] MULTIPLE CONE SYNCHRONIZER FOR VEHICLE TRANSMISSION

[75] Inventor: John M. Loeffler, Toledo, Ohio

[73] Assignee: Dana Corporation, Toledo, Ohio

[21] Appl. No.: 394,370

[22] Filed: Feb. 24, 1995

[51] Int. Cl.⁶ .................................................. F16D 23/04
[52] U.S. Cl. .................... 192/53.32; 192/53.34; 74/339
[58] Field of Search .................... 192/53.32, 53.34, 192/53.361, 53 F; 74/339

[56] References Cited

U.S. PATENT DOCUMENTS

| | | |
|---|---|---|
| 3,272,291 | 9/1966 | Flinn . |
| 4,732,247 | 3/1988 | Frost . |
| 4,807,733 | 2/1989 | Adler . |
| 4,811,825 | 3/1989 | Christian et al. ............. 192/53.32 |
| 4,823,631 | 4/1989 | Kishimoto . |
| 4,901,835 | 2/1990 | Frost ............................ 192/53.32 |
| 5,085,303 | 2/1992 | Frost . |
| 5,135,087 | 8/1992 | Frost . |
| 5,162,026 | 11/1992 | Krisher . |

FOREIGN PATENT DOCUMENTS

| 93626 | 4/1989 | Japan ........................ 192/53 F |

*Primary Examiner*—Rodney H. Bonck
*Assistant Examiner*—Saul Rodriguez
*Attorney, Agent, or Firm*—MacMillan, Sobanski & Todd

[57] ABSTRACT

A transmission gear synchronizing apparatus includes a longitudinally extending drive shaft, a ratio gear journally mounted on the drive shaft, a hub fixed on the drive shaft, an internally splined, annular shiftable clutch collar mounted for coaxial movement with the drive shaft to enable engagement with both the hub and the ratio gear, thereby linking the ratio gear with the hub, and a synchronizing assembly positioned between the clutch collar and the ratio gear and mounted for coaxial movement with the drive shaft. The synchronizing assembly includes an outer ring, an inner ring and a center ring. The outer ring has an externally splined surface for engagement with the internal splines of the clutch collar, and a frustoconical interior surface, the outer ring being connected to the hub for rotation with the hub. The inner ring has a frustoconical outer surface and a generally vertical end surface corresponding to a generally vertical surface on the ratio gear, the inner ring being connected to the hub for rotation with the hub and for transmitting torque to and from the hub. The center ring is positioned between the outer and inner rings, and has a frustoconical exterior surface corresponding to the outer ring interior surface, and has a frustoconical interior surface corresponding to the inner ring exterior surface, the center ring being connected to the ratio gear for rotation with the ratio gear. Friction surfaces are positioned between the center ring exterior surface and the outer ring interior surface, between the center ring interior surface and the inner ring exterior surface, and between the inner ring vertical end surface and the ratio gear vertical surface.

60 Claims, 3 Drawing Sheets

5,560,461

MULTIPLE CONE SYNCHRONIZER FOR VEHICLE TRANSMISSION

BACKGROUND OF THE INVENTION

This invention relates in general to vehicle transmissions and in particular to an improved system for synchronizing the speeds of various rotating members to enable smooth gear shifts in a vehicle transmission.

In most vehicles, a transmission is provided in the drive train between the engine and the driven wheels. As is well known, the transmission includes a housing containing an input shaft, an output shaft, and a plurality of meshing gears which are selectively connected between the input shaft and the output shaft. The meshing gears contained within the transmission housing are of is varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission. Movement of the control member causes certain ones of the meshing gears, referred to as "ratio gears", to be connected between the input shaft and the output shaft so as to provide the desired gear ratio between the input shaft and the output shaft. In a manual transmission, movement of the control member is accomplished by manual exertion of the vehicle driver, such as through a shift lever. In an automatic transmission, movement of the control member is accomplished by a pneumatic, hydraulic or electrical actuator in response to predetermined operating conditions.

In typical vehicle transmissions, the mechanism to engage various gears is the axial movement of splined, rotatable members into engagement with each other. A control member, such as a splined clutch collar, is moved axially from a neutral position to a position in which the clutch collar splines engage the splines of a rotatable ratio gear. The ratio gear may be linked indirectly to the transmission input shaft. The splines of the clutch collar also engage the splines of a rotatable drive gear, such as a hub, which is linked to or directly mounted on a drive shaft, such as a mainshaft. Thus, the clutch collar is rotatably mounted and is moveable axially to simultaneously engage the splines of the ratio gear and the hub, thereby connecting the mainshaft to a specific driven gear.

In order to accomplish the engagement of the various gears in a smooth manner, the rotating members, such as the clutch collar and the ratio gear which are to be interconnected, must be rotating at approximately the same rate. Otherwise, the splines of the one rotating member will not be able to intermesh with the splines of the other without crashing. Various ways are known for synchronizing the speeds of various rotating members. A commonly used synchronizing apparatus employs a series of frustoconically shaped rotatable members which nest with generally parallel contact surfaces. At least one of the frustoconical surfaces is connected directly or indirectly to one of the rotating splined members, and another of the frustoconical surfaces is connected to the other of the rotating splined members. An initial movement of the splined members toward each other causes the frustoconical surfaces, rotating at different speeds, to be pressed together. The frictional force between the frustoconical surfaces causes an equalization of speeds, thereby enabling the complete engagement of the rotating splined members.

One of the problems with synchronization devices in the past is that they require extensive tooling and are expensive to make. Also, they require a significant amount of labor for manufacture and assembly. Consumers' demands for more smoothly operating and rapidly shifting transmissions means that even more powerful synchronization devices are required. In a synchronization system using frustoconical surfaces, one method for increasing the power is by using more of the frustoconical surfaces, thereby providing more area for frictional forces to take effect. However, adding additional frustoconical surfaces increases the cost of the synchronization device. Another method for increasing the power of synchronization devices is to increase the diameter or distance from the axial centerline at which the torque generated by the frictional force between adjacent frustoconical forces is applied. Moving the force radially outwardly increases the moment arm and thereby increases the torque applied by the frictional forces. Unfortunately, increasing the distance from the axial centerline also increases the size and weight of the synchronization apparatus, which is an undesirable result. Also, the volume within the transmission is not unlimited, and increasing the diameter of the synchronization device may not be feasible.

There is a need for an improved synchronization apparatus which provides a higher power density or synchronization capacity within a given volume. The synchronization apparatus should be compact, and should be capable of being assembled with a minimum of labor. Further, the synchronization apparatus should have a low cost in terms of materials, and should have low machining costs.

SUMMARY OF THE INVENTION

A low cost, improved synchronization apparatus has now been developed. The improved synchronization apparatus provides a high power density or synchronization capacity within a given volume by providing two pairs of frustoconical mated friction surfaces and one vertical friction surface. The synchronization apparatus is provided in conjunction with an internally splined, shiftable clutch collar mounted for coaxial movement with respect to a drive shaft to enable engagement with both a hub connected to the drive shaft and a ratio gear, thereby linking the ratio gear with the hub.

The synchronization assembly comprises three primary rings: an outer ring, an inner ring, and a center ring. In general, the outer and inner rings rotate with the hub, while the center ring rotates with the ratio gear, and the frictional forces between the rings equalize the speeds of the hub and ratio gear. The outer ring has an externally splined surface for engagement with the internal splines of the clutch collar, and a frustoconical interior surface, and the outer ring is connected to the hub for rotation with the hub. The inner ring has a frustoconical outer surface and a generally vertical end surface corresponding to a generally vertical surface on the ratio gear. The inner ring is connected to the hub for rotation with the hub and for transmitting torque to and from the hub. The center ring is positioned between the outer and inner rings, and has a frustoconical exterior surface corresponding to the outer ring interior surface, and has a frustoconical interior surface corresponding to the inner ring exterior surface. Friction surfaces are positioned between the center ring exterior surface and the outer ring interior surface, between the center ring interior surface and the inner ring exterior surface, and between the inner ring vertical end surface and the ratio gear vertical surface.

In a specific embodiment of the invention, the outer ring is connected to the hub to maintain the alignment of the outer ring.

In another embodiment of the invention, the inner ring is connected to the hub by a plurality of tangs. Preferably, the hub contains a plurality of recesses for receiving the tangs of the inner ring.

In a particular embodiment of the invention, both the inner and outer rings are connected to the hub by a plurality of tangs, and the hub contains a plurality of recesses for receiving the tangs of the inner and outer rings, with each recess receiving a tang from the inner ring and a tang from the outer ring. Preferably, the fit of the inner ring tangs within the hub recesses is tighter than the fit of the outer ring tangs within the hub recesses. This can be accomplished by a making the outer ring tangs narrower than the inner ring tangs.

In yet another embodiment of the invention, the center ring is connected to the ratio gear by a plurality of tangs, and the ratio gear contains a plurality of recesses for receiving the tangs of the center ring.

Various objects and advantages of this invention will become apparent to those skilled in the an from the following detailed description of the preferred embodiments, when read in light of the accompanying drawings.

BRIEF DESCRIPTION OF THE DRAWINGS

FIG. 1 is an exploded perspective view of the transmission synchronization assembly illustrated in FIG. 1.

DETAILED DESCRIPTION OF THE PREFERRED EMBODIMENTS

Figure 1:
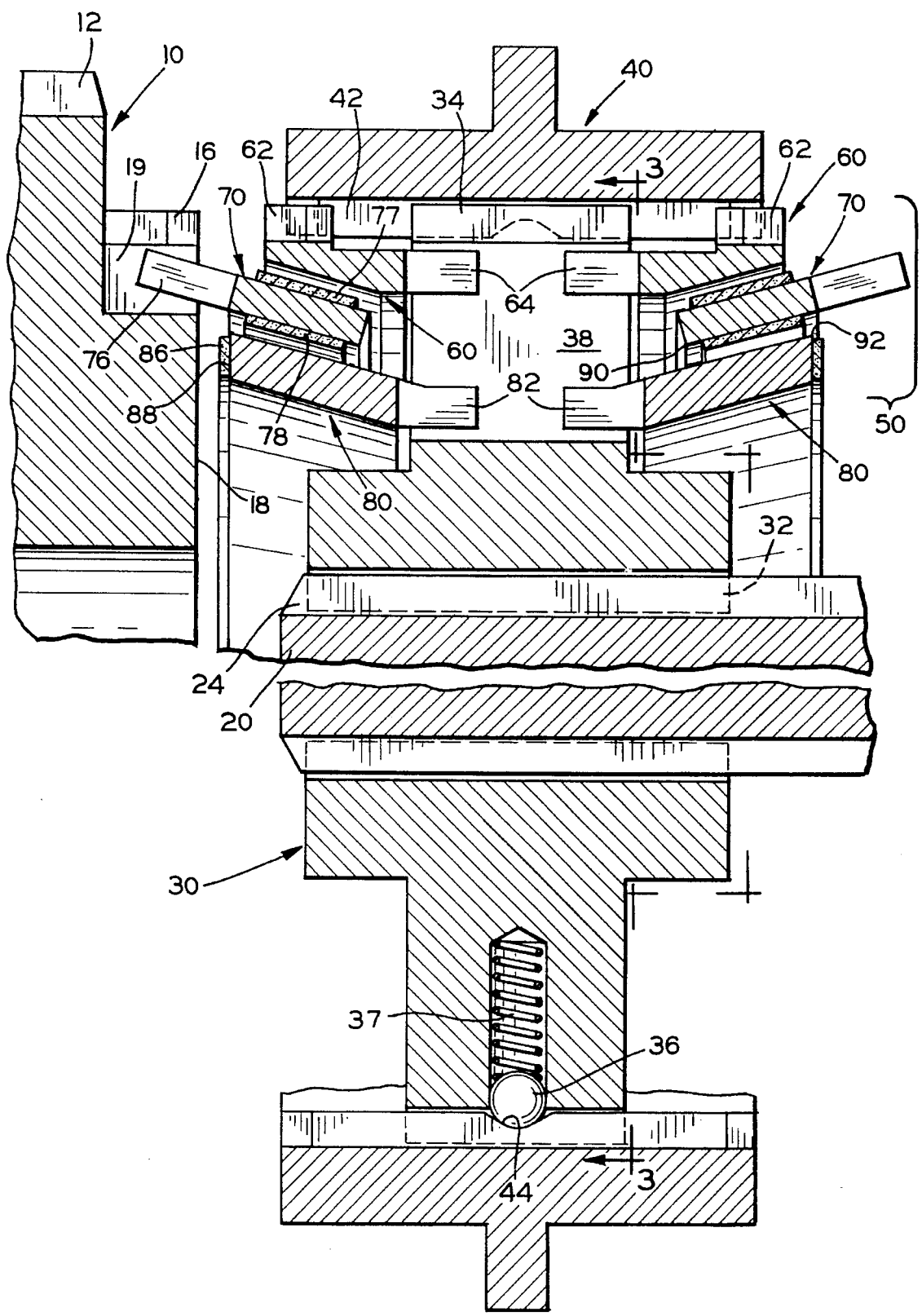
FIG. 1 is a schematic cross-sectional view in elevation, of a transmission synchronization assembly in accordance with this invention.
Figure 2:
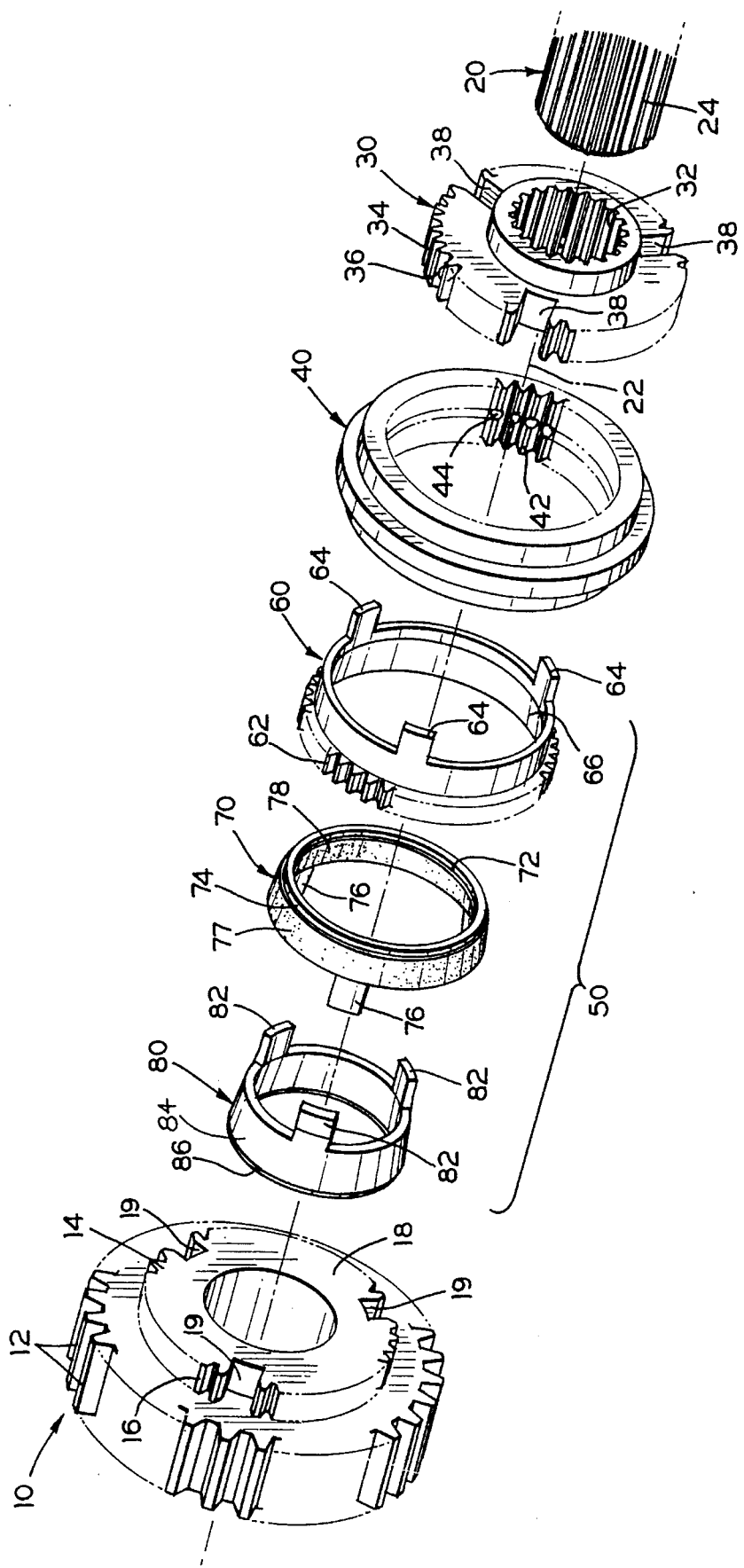

Referring now to the drawings, there is illustrated in FIGS. 1 and 2 a vehicle transmission gear synchronization apparatus suitable for use in facilitating gear shifting in transmissions. The ratio gear is shown generally at 10. The main shaft is illustrated generally at 20. Mounted on the main shaft is a hub illustrated generally at 30. Clutch collar 40 is moveable axially to connect the rotative force of the ratio gear 10 with the hub 30, and thereby provide a link between the ratio gear 10 and the main shaft 20.

The ratio gear is journally mounted on a drive shaft for rotation. The ratio gear is adapted with gear teeth 12 which mesh with gear teeth on a complimentary gear wheel, not shown. Typically, the ratio gear is linked through the gear wheel to a rotating countershaft, not shown, which is linked to the transmission input shaft receiving torque from the vehicle engine. Thus, the ratio gear receives driving force from the vehicle engine. The ratio gear 10 is one of several similar ratio gears of different diameters receiving torque from the vehicle engine in the same manner. The structure and operation of vehicle transmissions providing torque to ratio gears is conventional and well known in the art.

Connected to the ratio gear 10 is clutch gear 14. The clutch gear has ratio gear splines 16 for connection with the clutch collar 40. The clutch gear has a generally vertical sidewall or surface 18. The clutch gear is adapted with notches or slots 19 for connection with other parts of the synchronization apparatus, as will be explained below.

A drive shaft, such as main shaft 20, is supported by bearings, not shown, and mounted for rotation about axis of rotation 22. The main shaft is linked through various connections, such as universal joints, not shown, to the driving wheels of the vehicle in a manner which is well known to those skilled in the art. If desired, a second gear box, such as a range, not shown, can be provided between the main shaft 20 and the transmission output. The main shaft is adapted with splines 24 for meshing with other parts of the transmission apparatus, such as the hub 30.

Figure 3:
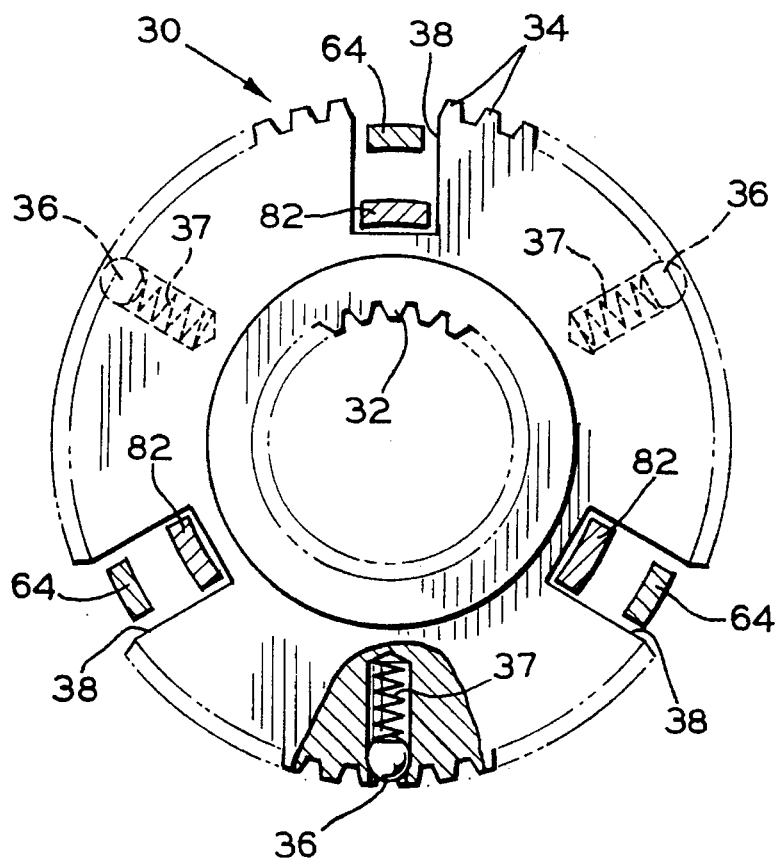
FIG. 3 is an end view in elevation of the hub illustrated in FIGS. 1 and 2.

Hub 30 is mounted on the main shaft 20 for rotation with the main shaft. The hub is one of several hubs, and its purpose is to supply rotative force to the main shaft, in a manner well known to those skilled in the art. As shown in FIGS. 1–3, the hub has internal splines 32 which correspond with main shaft splines 24 to provide a driving rotative connection. The hub is moveable axially a short distance. The hub is adapted on its outer circumference with hub splines 34 for rotative connection with the clutch collar 40. The hub is adapted with a plurality of detent balls 36 which are mounted with detent springs 37 in a manner which urges the detent balls radially outwardly. The detent balls provide a means for centering or locating the clutch collar 40 in a neutral position with respect to the hub. The hub 30 is also adapted with a plurality of recesses 38 for receiving various parts of the synchronization apparatus, as will be explained below.

The clutch collar is illustrated in FIG. 1 in a neutral or non-gear engaging position. The clutch collar is mounted for rotation and is movable axially, to the left or to the right as shown in FIG. 1. Clutch collar 40 is one of several clutch collars typically employed in transmissions. As is well known, axial movement of clutch collars in vehicle transmissions is accomplished by respective shift forks (not shown) which engage each of the clutch collars. The shift forks are mounted on respective shift rails (not shown) for axial movement forwardly and rearwardly. Typically, a shift tower containing a manually operable shift lever (not shown) is provided for selecting one of the shift rails for movement and for shifting the selected shift rail forwardly or rearwardly as desired. It will be appreciated, however, that such selecting and shifting actions may alternatively be performed by any known automatic or automated manual apparatus.

The interior surface of clutch collar 40 is adapted with clutch collar splines 42 which coact with the hub splines 34 in a meshing relationship to transmit torque to and from the hub. As can be seen from the drawings, movement of the clutch collar 40 to the left will cause engagement of the clutch collar splines 42 with the ratio gear splines 16, thereby providing a driving connection from the ratio gear 10 through the clutch collar 40 and through the hub 30 to the main shaft 20. For purposes of clarity only one ratio gear is shown in FIG. 1. It is to be understood that the clutch collar is usually adapted with a pair of ratio gears, so that movement of the clutch collar to the left engages one ratio gear and movement to the right engages a different ratio gear.

The clutch collar 40 is adapted on its interior surface with a groove, such as detent 44. The detent provides a home base or neutral position for the hub 30 because the detent balls 36 are urged radially outwardly by detent springs 37. The combination of the detent and the detent balls ties the hub to the clutch collar so that a small axial movement of the clutch collar causes the same small axial movement of the hub. However, axial movement of the clutch collar beyond a small distance requires full depression of the detent balls, because the hub can move only a small distance in the axial direction.

The synchronizing assembly is indicated generally at 50, and generally comprises outer ring 60, center ring 70 and inner ring 80. The synchronizing assembly is generally positioned between the clutch collar and the ratio gear and mounted for coaxial movement with the main shaft 20. Outer ring 60 is mounted radially inside the clutch collar. Outer ring splines 62 are adapted to intermesh with the clutch collar splines 42 when the clutch collar is moved axially. The outer ring is provided with a plurality of projections, such as tangs 64, which are aligned with and received by hub recesses 38. The outer ring tangs fit into the recesses 38 rather loosely, providing a small amount of movement or "play" in the rotative or circumferential direction. The connection of the outer ring to the hub 30 with the tangs 64 maintains the proper alignment of the outer ring. Also, the outer ring will always rotate at the same speed as the hub. The outer ring 60 has an interior surface 66 which is frustoconical in shape. This corresponds with a similar surface on the center ring 70. Preferably the interior surface 66 is a ground surface so that there will be close tolerances with the adjoining center ring.

The center ring 70 is positioned next to the outer ring 60. The center ring has interior surface 72 and exterior surface 74, both of which are frustoconical in shape. The center ring has a plurality of tangs 76 adapted to fit into ratio gear slots 19 in the clutch gear 14. By providing the center ring tangs and the ratio gear slots, the center ring will always rotate at the same speed as the ratio gear 10. The center ring 70 has a friction surface applied to both the interior surface 72 and the exterior surface 74. Upper friction surface 77 is positioned on center ring exterior surface 74, and lower friction surface 78 is positioned on center ring interior surface 72. It is to be understood that the synchronization assembly of the invention could provide the friction surfaces on the inner and outer rings 80, 60 as well as on the center ring.

The inner ring 80 is adapted with a plurality of tangs 82 which are adapted to fit into hub recesses 38. The inner ring tangs are not as narrow as the outer ring tangs 64, and therefore provide a tighter fit within the hub recesses 38. The effect of the tighter fit between the inner ring tangs and the hub recesses is that movement of the hub 30 is more directly applied to the inner ring 80 than to the outer ring 60. The inner ring has an exterior surface 84 which is frustoconical in shape and is adapted to correspond with the center ring interior surface 72. The inner ring has a friction lining 86 secured to a radially extending end 88. The friction lining 86 is adapted to engage the ratio gear vertical surface 18 when the two surfaces are pressed together, and thereby provide a braking action. It is to be understood that the friction lining 86 could be just as well placed on the ratio gear vertical surface.

During assembly of the synchronization assembly, the outer ring 60 is first placed or mounted around the main shaft, followed by the center ring 70, and then by the inner ring 80 and ratio gear 10. It can be seen in FIG. 1 that radially inward or bottom corner 90 of the center ring is smaller in diameter than radially outward top corner 92 of the inner ring 80. This precludes assembly of the inner ring 80 prior to the placement of center ring 70. This means that the inner ring must be attached to the hub 30 after all the rings 60, 70 and 80 are in place. The inner ring is not held in place or axially located by any mechanical device such as a snap ring, but rather is free to float axially between the ratio gear and the hub.

In operation, the ratio gear 10 is generally moving at a rotation speed, and the main shaft and hub are generally moving at a different rotation speed. As the operator of the vehicle begins to shift into the ratio gear, the clutch collar 40 is shifted (to the left as shown in FIG. 1) a small distance. The detent and detent ball will provide a resistance to relative movement between the clutch collar and the hub 30. Therefore the hub will move a small distance (to the left as shown in FIG. 1).

Moving the hub a small distance pushes the outer ring 60 axially or laterally toward the ratio gear 10. This has two effects. First, the movement of the outer ring forces the outer, center and inner rings into compression. Since the rotation of the outer and inner rings is tied to rotation of the hub, and since the rotation of the center ring is tied to rotation of the ratio gear, the center ring is rotating at a speed different from the speed of the inner and outer rings. The compression caused by axial movement of the outer ring causes the frictional surfaces to be engaged and to begin to cause the frustoconical surfaces to assume the same speed.

Figure 4:
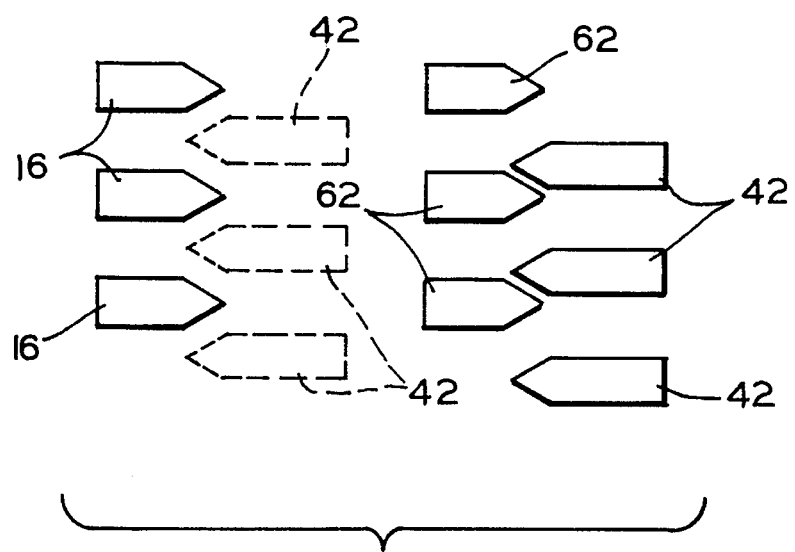
FIG. 4 is a schematic plan view of the splines of the clutch collar, the outer ring and the ratio gear illustrated in FIGS. 1 and 2.

The second effect occurring when the movement of the hub 30 causes a slight axial movement of the outer ring is that the outer ring becomes slightly rotated or indexed with respect to the hub by the frictional drag from the center ring. The outer ring tangs 64 are free to move slightly or index in a rotational direction. As shown in FIG. 4, the slight rotation or indexing of outer ring 60 with respect to the hub 30 means that the clutch collar splines 42 are directly aligned with the outer ring splines 62. When this alignment occurs, the outer ring splines interfere with the clutch collar splines, and prevent them, and hence the clutch collar, from advancing in the axial direction. As long as the frictional forces arising from the differences in speed among the inner, outer and center rings keep the clutch collar splines rotated or indexed with respect to the outer ring, the outer ring splines will prevent axial movement of the clutch collar splines past the outer ring splines and into engagement with the ratio gear splines 16.

Once the speeds of the ratio gear 10 and the hub 30 have been equalized or synchronized, there will be little or no frictional forces causing a slight rotation or indexing of the clutch collar 40 with respect to the outer ring 60. The clutch collar splines 42 then can be moved axially into intermeshing engagement with the ratio gear splines 16, in the position shown in phantom lines in FIG. 4. Movement of the clutch collar past the outer ring splines causes the detent ball to be forced down into its pocket. It can be seen that the three frictional surfaces, upper frictional surface 77, lower frictional surface 78 and friction lining 86 all act to equalize the rotational speed of the ratio gear 10 with the rotational speed of the clutch collar/hub/main shaft (which are all rotationally tied together).

It will be evident from the foregoing that various modifications can be made to this invention. Such, however are considered as being within the scope of the invention.

What is claimed is:

1. A synchronizing apparatus for a transmission including a drive shaft having a gear journalled thereon, said synchronizing apparatus comprising:

a hub adapted to be connected for rotation with the drive shaft;

a clutch collar connected for rotation with said hub and for axial movement relative thereto between a first position, wherein said clutch collar is adapted to engage the gear to provide a rotational driving connection between the drive shaft and the gear, and a second position, wherein said clutch collar is adapted to not engage the gear; and a synchronizing assembly including:

an outer ring connected for rotation with said hub and said clutch collar and having an inner friction surface;

an inner ring connected for rotation with said hub and said clutch collar and having an outer friction surface, said inner ring further including a friction lining secured to a radially extending end which is adapted to selectively engage the gear when said clutch collar is moved toward said first position to provide a braking action therewith; and a center ring adapted to be connected for rotation with the gear and having an outer friction surface which engages said inner friction surface of said outer ring and an inner friction surface which engages said outer surface of said inner ring when said clutch collar is moved toward said first position.

2. The synchronizing apparatus defined in claim 1 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

3. The synchronizing apparatus defined in claim 1 wherein said outer ring includes a tang, said inner ring includes a tang, and said outer ring tang and said inner ring tang extend into a recess formed in said hub to connect said outer ring for rotation with said hub and said clutch collar and said inner ring for rotation with said hub and said clutch collar.

4. The synchronizing apparatus defined in claim 3 wherein said outer ring includes a plurality of tangs, said inner ring includes a plurality of tangs, and said hub is formed having a plurality of recesses, each of said hub recesses receiving one of said outer ring tangs and one of said inner ring tangs.

5. The synchronizing apparatus defined in claim 1 wherein said center ring includes a tang which is adapted to extend into a recess formed in the gear to connect said center ring for rotation with the gear.

6. The synchronizing apparatus defined in claim 1 wherein said clutch collar is formed having internal splines which cooperate with external splines formed on said hub.

7. The synchronizing apparatus defined in claim 1 further including means for locating said clutch collar in a neutral position with respect to said hub.

8. The synchronizing apparatus defined in claim 7 wherein said means for locating said clutch collar in a neutral position includes a detent provided on an interior surface of said clutch collar and a detent ball, said detent ball being mounted in said hub and urged by a detent spring into cooperation with said detent.

9. The synchronizing apparatus defined in claim 1 wherein said clutch collar is formed having internal splines which cooperate with external splines formed on said outer ring.

10. The synchronizing apparatus defined in claim 1 wherein said friction lining of said inner ring is a first friction lining secured to a first radially extending end which is adapted to selectively engage a first gear when said clutch collar is moved toward said first position to provide a braking action therewith, and further including a second friction lining secured to a second radially extending end of said inner ring which is adapted to selectively engage a second gear when said clutch collar is moved toward a third position to provide a braking action therewith.

11. A transmission gear synchronizing apparatus comprising:

a drive shaft;

a gear journalled on said drive shaft; and a synchronizing apparatus including a hub connected for rotation with said drive shaft, a clutch collar connected for rotation with said hub and for axial movement relative thereto between a first position, wherein said clutch collar engages said gear to provide a rotational driving connection between said drive shaft and said gear, and a second position, wherein said clutch collar does not engage said gear, and a synchronizing assembly including:

an outer ring connected for rotation with said hub and said clutch collar and having an inner friction surface;

an inner ring connected for rotation with said hub and said clutch collar and having an outer friction surface, said inner ring further including a friction lining secured to a radially extending end which selectively engages said gear when said clutch collar is moved toward said first position to provide a braking action therewith; and a center ring connected for rotation with said gear and having an outer friction surface which engages said inner friction surface of said outer ring and an inner friction surface which engages said outer surface of said inner ring when said clutch collar is moved toward said first position.

12. The transmission gear synchronizing apparatus defined in claim 11 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

13. The transmission gear synchronizing apparatus defined in claim 11 wherein said outer ring includes a tang, said inner ring includes a tang, and said outer ring tang and said inner ring tang extend into a recess formed in said hub to connect said outer ring for rotation with said hub and said clutch collar and said inner ring for rotation with said hub and said clutch collar.

14. The transmission gear synchronizing apparatus defined in claim 13 wherein said outer ring includes a plurality of tangs, said inner ring includes a plurality of tangs, and said hub is formed having a plurality of recesses, each of said hub recesses receiving one of said outer ring tangs and one of said inner ring tangs.

15. The transmission gear synchronizing apparatus defined in claim 11 wherein said center ring includes a tang which is adapted to extend into a recess formed in the gear to connect said center ring for rotation with the gear.

16. The transmission gear synchronizing apparatus defined in claim 11 wherein said clutch collar is formed having internal splines which cooperate with external splines formed on said hub.

17. The transmission gear synchronizing apparatus defined in claim 11 further including means for locating said clutch collar in a neutral position with respect to said hub.

18. The transmission gear synchronizing apparatus defined in claim 17 wherein said means for locating said clutch collar in a neutral position includes a detent provided on an interior surface of said clutch collar and a detent ball, said detent ball being mounted in said hub and urged by a detent spring into cooperation with said detent.

19. The transmission gear synchronizing apparatus defined in claim 11 wherein said clutch collar is formed having internal splines which cooperate with external splines formed on said outer ring.

20. The transmission gear synchronizing apparatus defined in claim 11 wherein said friction lining of said inner ring is a first friction lining secured to a first radially extending end which selectively engages said first gear when said clutch collar is moved toward said first position to provide a braking action therewith, and further including a second friction lining secured to a second radially extending end of said inner ring which selectively engages a second gear when said clutch collar is moved toward a third position to provide a braking action therewith.

21. A synchronizing apparatus for a transmission including a drive shaft having a gear journalled thereon, said synchronizing apparatus comprising:

a hub adapted to be connected for rotation with the drive shaft;

a clutch collar connected for rotation with said hub and for axial movement relative thereto between a first position, wherein said clutch collar is adapted to engage the gear to provide a rotational driving connection between the drive shaft and the gear, and a second position, wherein said clutch collar is adapted to not engage the gear; and a synchronizing assembly including:

an outer ring including a tang which extends loosely into a recess formed in said hub to connect said outer ring for rotation with said hub and said clutch collar while permitting a small amount of relative circumferential movement therebetween, said outer ring further having an inner friction surface;

an inner ring including a tang which extends into a recess formed in said hub to connect said inner ring for rotation with said hub and said clutch collar, said inner ring further having an outer friction surface; and a center ring adapted to be connected for rotation with the gear and having an outer friction surface which engages said inner friction surface of said outer ring and an inner friction surface which engages said outer surface of said inner ring when said clutch collar is moved toward said first position.

22. The synchronizing apparatus defined in claim 21 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

23. The synchronizing apparatus defined in claim 21 wherein said outer ring includes a plurality of tangs, said inner ring includes a plurality of tangs, and said hub is formed having a plurality of recesses, each of said hub recesses receiving one of said outer ring tangs and one of said inner ring tangs.

24. The synchronizing apparatus defined in claim 21 wherein said center ring includes a tang which is adapted to extend into a recess formed in the gear to connect said center ring for rotation with the gear.

25. The synchronizing apparatus defined in claim 21 wherein said clutch collar is formed having internal splines which cooperate with external splines formed on said hub.

26. The synchronizing apparatus defined in claim 21 further including means for locating said clutch collar in a neutral position with respect to said hub.

27. The synchronizing apparatus defined in claim 26 wherein said means for locating said clutch collar in a neutral position includes a detent provided on an interior surface of said clutch collar and a detent ball, said detent ball being mounted in said hub and urged by a detent spring into cooperation with said detent.

28. The synchronizing apparatus defined in claim 21 wherein said clutch collar is formed having internal splines which cooperate with external splines formed on said outer ring.

29. The synchronizing apparatus defined in claim 21 wherein said inner ring includes a first friction lining secured to a first radially extending end which is adapted to selectively engage the gear when said clutch collar is moved toward said first position to provide a braking action therewith.

30. The synchronizing apparatus defined in claim 29 wherein said inner ring further includes a second friction lining secured to a second radially extending end of said inner ring which is adapted to selectively engage a second gear when said clutch collar is moved toward a third position to provide a braking action therewith.

31. A transmission gear synchronizing apparatus comprising:

a drive shaft;

a gear journalled on said drive shaft; and a synchronizing apparatus including a hub connected for rotation with said drive shaft, a clutch collar connected for rotation with said hub and for axial movement relative thereto between a first position, wherein said clutch collar engages said gear to provide a rotational driving connection between said drive shaft and said gear, and a second position, wherein said clutch collar does not engage said gear; and a synchronizing assembly including:

an outer ring including a tang which extends loosely into a recess formed in said hub to connect said outer ring for rotation with said hub and said clutch collar while permitting a small amount of relative circumferential movement therebetween, said outer ring further having an inner friction surface;

an inner ring including a tang which extends into a recess formed in said hub to connect said inner ring for rotation with said hub and said clutch collar, said inner ring further having an outer friction surface; and a center ring connected for rotation with said gear and having an outer friction surface which engages said inner friction surface of said outer ring and an inner friction surface which engages said outer surface of said inner ring when said clutch collar is moved toward said first position.

32. The transmission gear synchronizing apparatus defined in claim 31 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

33. The transmission gear synchronizing apparatus defined in claim 31 wherein said outer ring includes a plurality of tangs, said inner ring includes a plurality of tangs, and said hub is formed having a plurality of recesses, each of said hub recesses receiving one of said outer ring tangs and one of said inner ring tangs.

34. The transmission gear synchronizing apparatus defined in claim 31 wherein said center ring includes a tang which is adapted to extend into a recess formed in the gear to connect said center ring for rotation with the gear.

35. The transmission gear synchronizing apparatus defined in claim 31 wherein said clutch collar is formed having internal splines which cooperate with external splines formed on said hub.

36. The transmission gear synchronizing apparatus defined in claim 31 further including means for locating said clutch collar in a neutral position with respect to said hub.

37. The transmission gear synchronizing apparatus defined in claim 36 wherein said means for locating said clutch collar in a neutral position includes a detent provided on an interior surface of said clutch collar and a detent ball, said detent ball being mounted in said hub and urged by a detent spring into cooperation with said detent.

38. The transmission gear synchronizing apparatus defined in claim 31 wherein said clutch collar is formed having internal splines which cooperate with external splines formed on said outer ring.

39. The transmission gear synchronizing apparatus defined in claim 31 wherein said inner ring includes a first friction lining secured to a first radially extending end which is adapted to selectively engage the gear when said clutch collar is moved toward said first position to provide a braking action therewith.

40. The transmission gear synchronizing apparatus defined in claim 39 wherein said inner ring further includes a second friction lining secured to a second radially extending end of said inner ring which is adapted to selectively engage a second gear when said clutch collar is moved toward a third position to provide a braking action therewith.

41. A synchronizing apparatus for a transmission including a drive shaft having a gear journalled thereon, said synchronizing apparatus comprising:

a hub adapted to be connected for rotation with the drive shaft;

a clutch collar connected for rotation with said hub and for axial movement relative thereto between a first position, wherein said clutch collar is adapted to engage the gear to provide a rotational driving connection between the drive shaft and the gear, and a second position, wherein said clutch collar is adapted to not engage the gear; and a synchronizing assembly including:

an outer ring including a tang which extends into a recess formed in said hub to connect said outer ring for rotation with said hub and said clutch collar, said tang of said outer ring defining a first circumferential width, said outer ring further having an inner friction surface;

an inner ring including a tang which extends into a recess formed in said hub to connect said inner ring for rotation with said hub and said clutch collar, said tang of said inner ring defining a second circumferential width which is greater than said first circumferential width of said tang of said outer ring, said inner ring further having an outer friction surface; and a center ring adapted to be connected for rotation with the gear and having an outer friction surface which engages said inner friction surface of said outer ring and an inner friction surface which engages said outer surface of said inner ring when said clutch collar is moved toward said first position.

42. The synchronizing apparatus defined in claim 41 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

43. The synchronizing apparatus defined in claim 41 wherein said outer ring includes a plurality of tangs, said inner ring includes a plurality of tangs, and said hub is formed having a plurality of recesses, each of said hub recesses receiving one of said outer ring tangs and one of said inner ring tangs.

44. The synchronizing apparatus defined in claim 41 wherein said center ring includes a tang which is adapted to extend into a recess formed in the gear to connect said center ring for rotation with the gear.

45. The synchronizing apparatus defined in claim 41 wherein said clutch collar is formed having internal splines which cooperate with external splines formed on said hub.

46. The synchronizing apparatus defined in claim 41 further including means for locating said clutch collar in a neutral position with respect to said hub.

47. The synchronizing apparatus defined in claim 46 wherein said means for locating said clutch collar in a neutral position includes a detent provided on an interior surface of said clutch collar and a detent ball, said detent ball being mounted in said hub and urged by a detent spring into cooperation with said detent.

48. The synchronizing apparatus defined in claim 41 wherein said clutch collar is formed having internal splines which cooperate with external splines formed on said outer ring.

49. The synchronizing apparatus defined in claim 41 wherein said inner ring includes a first friction lining secured to a first radially extending end which is adapted to selectively engage the gear when said clutch collar is moved toward said first position to provide a braking action therewith.

50. The synchronizing apparatus defined in claim 49 wherein said inner ring further includes a second friction lining secured to a second radially extending end of said inner ring which is adapted to selectively engage a second gear when said clutch collar is moved toward a third position to provide a braking action therewith.

51. A transmission gear synchronizing apparatus comprising:

a drive shaft;

a gear journalled on said drive shaft; and a synchronizing apparatus including a hub connected for rotation with said drive shaft, a clutch collar connected for rotation with said hub and for axial movement relative thereto between a first position, wherein said clutch collar engages said gear to provide a rotational driving connection between said drive shaft and said gear, and a second position, wherein said clutch collar does not engage said gear; and a synchronizing assembly including:

an outer ring including a tang which extends into a recess formed in said hub to connect said outer ring for rotation with said hub and said clutch collar, said tang of said outer ring defining a first circumferential width, said outer ring further having an inner friction surface;

an inner ring including a tang which extends into a recess formed in said hub to connect said inner ring for rotation with said hub and said clutch collar, said tang of said inner ring defining a second circumferential width which is greater than said first circumferential width of said tang of said outer ring, said inner ring further having an outer friction surface; and a center ring adapted to be connected for rotation with the gear and having an outer friction surface which engages said inner friction surface of said outer ring and an inner friction surface which engages said outer surface of said inner ring when said clutch collar is moved toward said first position.

52. The transmission gear synchronizing apparatus defined in claim 51 wherein said outer ring has a frustoconical interior surface, said inner ring has a frustoconical exterior surface, and said center ring has a frustoconical exterior surface corresponding to said outer ring frustoconical interior surface and a frustoconical interior surface corresponding to said inner ring frustoconical exterior surface.

53. The transmission gear synchronizing apparatus defined in claim 51 wherein said outer ring includes a plurality of tangs, said inner ring includes a plurality of tangs, and said hub is formed having a plurality of recesses, each of said hub recesses receiving one of said outer ring tangs and one of said inner ring tangs.

54. The transmission gear synchronizing apparatus defined in claim 51 wherein said center ring includes a tang which is adapted to extend into a recess formed in the gear to connect said center ring for rotation with the gear.

55. The transmission gear synchronizing apparatus defined in claim 51 wherein said clutch collar is formed having internal splines which cooperate with external splines formed on said hub.

56. The transmission gear synchronizing apparatus defined in claim 51 further including means for locating said clutch collar in a neutral position with respect to said hub.

57. The transmission gear synchronizing apparatus defined in claim 56 wherein said means for locating said clutch collar in a neutral position includes a detent provided on an interior surface of said clutch collar and a detent ball, said detent ball being mounted in said hub and urged by a detent spring into cooperation with said detent.

58. The transmission gear synchronizing apparatus defined in claim 51 wherein said clutch collar is formed having internal splines which cooperate with external splines formed on said outer ring.

59. The transmission gear synchronizing apparatus defined in claim 51 wherein said inner ring includes a first friction lining secured to a first radially extending end which is adapted to selectively engage the gear when said clutch collar is moved toward said first position to provide a braking action therewith.

60. The transmission gear synchronizing apparatus defined in claim 59 wherein said inner ring further includes a second friction lining secured to a second radially extending end of said inner ring which is adapted to selectively engage a second gear when said clutch collar is moved toward a third position to provide a braking action therewith.

\* \* \* \* \*